Feb. 12, 1952 — A. E. SCHUBERT ET AL — 2,585,276
CONTROL SYSTEM FOR PHOTOGRAPHIC DOCUMENT COPYING MACHINES
Filed Dec. 20, 1947

ROY S. HOPKINS (DEC'D)
BY LINCOLN ROCHESTER TRUST CO., EXEC.
ALVIN E. SCHUBERT
JOHN F. EGAN
INVENTORS

Feb. 12, 1952     A. E. SCHUBERT ET AL     2,585,276
CONTROL SYSTEM FOR PHOTOGRAPHIC DOCUMENT COPYING MACHINES
Filed Dec. 20, 1947     3 Sheets-Sheet 2

Patented Feb. 12, 1952

2,585,276

UNITED STATES PATENT OFFICE 2,585,276

CONTROL SYSTEM FOR PHOTOGRAPHIC DOCUMENT COPYING MACHINES

Alvin E. Schubert and John F. Egan, Rochester, N. Y., and Roy S. Hopkins, deceased, late of Rochester, N. Y., by Lincoln Rochester Trust Company, executor, Rochester, N. Y., assignors to Eastman Kodak Company, Rochester, N. Y., a corporation of New Jersey Application December 20, 1947, Serial No. 792,880

28 Claims. (Cl. 88—24)

This invention relates to an apparatus for photographically copying documents and more particularly to an interlocking control arrangement for controlling the idle operating period, the auxiliary film wind, and the document and film drive.

As is well known in document-copying machines in which only one side of the document is photographed or in a duplex type in which both sides of the document are photographed, automatic shut-down of the machine may be accomplished by film breakage, by the depletion of the film in the camera, or by failure of one or more lamps. In all of these cases, however, the shut-down is due to the failure of some part of the machine. Automatic shut-down of the machine may also be caused by the feeding of several documents or a thick document into the machine. Both types of machines fail at the present time, however, to provide an automatic shut-down of the machine after a predetermined period of idle operation, that is, the interval between successive documents, and in a great many cases this interval may be of relatively long duration particularly in cases where the operator is called away from or leaves the machine while it is still running.

In the photographing of documents, it is the usual practice to wind off a fixed amount of film before the camera is removed from the machine and after the camera has been replaced. This winding off of the film protects the last exposure against fogging or light leak and also insures an unfogged area of film in the exposure position when the camera is replaced. The auxiliary film drive is usually controlled by the opening or closing of the cover after the machine has been stopped.

In the present invention, automatic shut-down of the machine is accomplished by a control unit actuated by the film drive. After a predetermined interval, if no documents have been fed into the machine, it is automatically shut off. In order to start the machine, the control unit has to be returned or reset to its initial position. The control means is actuated by the document moving into the photographic station, and each successive document resets the control unit unless a period of approximately 90 seconds has elapsed between documents. This arrangement eliminates excessive wear on a lot of moving parts, and also provides for a reduced operating cost. The control for the auxiliary film wind is also interlocked with the drive operating circuit whereby the opening or closing of the casing cover operates a switch for rendering the document and film drive inoperative or operative before and after the predetermined winding interval respectively. A plurality of normally-open switches in series circuit with the drive operating circuit are also provided and are adapted to be closed by the proper positioning of the glass guides and mirrors. If any one of the glass guides or mirrors is replaced improperly after the removal for cleaning or replacement, the drive operating circuit will be inoperative. The above interlocking controls together with those controls already well known provide a control system which covers both machine failures and failures on the part of the operator due to oversight or carelessness.

The primary object of the invention, therefore, is to provide a document-copying machine in which the maintenance of a closed drive operating circuit is dependent upon successive feeding of documents into the machine, upon the cover remaining in the closed position, and the proper positioning of the glass guides and mirrors.

Another object of the invention is to provide a document-copying machine in which a control unit for the document and film drive will automatically shut down the machine after a predetermined interval has elapsed between successive documents.

A further object of the invention is to provide a document-copying machine in which a control unit for the document and film drive will shut down the machine after a predetermined interval and which may be reset at any time before the predetermined interval has elapsed.

A still further object of the invention is to provide a document-copying machine in which a control unit for the document and film drive will shut down the machine after a predetermined interval and which may be reset by a document moving into the feeding station before the predetermined interval has elapsed and by a start bar adjacent the feeding station after the predetermined interval has elapsed.

Yet another object of the invention is to provide a document-copying machine in which a control unit for the document and film drive will shut down the film drive after a predetermined interval has elapsed between successive documents and which may be reset at any time during or after the predetermined interval by a document moving into the photography station or by a start bar adjacent the feeding station, respectively.

And another object of the invention is to provide a document-copying machine in which the document and film drive is rendered inoperative when the casing cover is moved to the open position and rendered operative after a predetermined interval when the cover is moved to the closed position.

And still another object of the invention is to provide a document-copying machine in which the operation of the document and film drive and auxiliary film drive is controlled by a switch actuated by the movement of the casing cover to the open or closed position.

Yet another object of the invention is to provide a document-copying machine in which the operation of the document and film drive and auxiliary film drive is controlled by a cover actuated switch and actuating members associated with the auxiliary film drive for rendering the document and film drive inoperative or operative and the auxiliary film drive operative or inoperative when the cover is moved to the open or closed position, respectively.

A still further object of the invention is to provide a document-copying machine in which the drive operating circuit is maintained closed only when the glass guides and mirrors are properly positioned.

And still another object of the invention is to provide a document-copying machine in which a plurality of normally-open switches are in series circuit with the drive operating circuit and maintain the drive operating circuit closed only when all of the switches are closed by the proper positioning of the glass guides and mirrors.

These and other objects of the invention will be apparent to those skilled in the art by the description which follows:

The above objects of the invention are embodied in an apparatus for photographically copying documents and in which a document is supported in and continuously moved through a photographic station in the casing which is provided with a cover movable to an open and a closed position. A drive means is provided for moving the document from the feeding station on the top of the casing to the photographing station where the document passes between a pair of glass guides. A camera, which supports the light-sensitive material in the exposure station, is mounted on a hanger for locating the camera in optical relation to the photographing station. A mirror is positioned adjacent and on each side of the photographing station and between the photographing station and exposure station for directing the reflected document images into the camera. A second drive means is operatively connected to the document drive means for moving the light-sensitive material in the camera in synchronism with the document. A control means is operatively connected to the second drive means for automatic shut-down of the machine after a predetermined interval has elapsed between successive documents inserted in the feeding station and is adapted to be reset at any time during or after the predetermined interval. An actuating means operated by a document in the feeding station resets the control means before the predetermined interval has elapsed. The drive operating circuit, which includes a start switch, a reset solenoid and a motor, and the control circuit, which includes a solenoid and a holding switch, are controlled by the start switch for closing the circuits and resetting the control means after the predetermined interval has elapsed. A plurality of normally-open switches in series circuit with the operating circuit drive and control circuit maintain the circuits closed only when the glass guides and mirrors are properly positioned to close the switches. The auxiliary film drive comprises a motor connected through a gear train to the film take-up and film drive shafts in the camera and which is in series with a cover actuated switch and in series parallel with a normally-closed switch and one pole of a double-pole switch, the other pole of the double-pole switch being in series with the drive operating circuit and the control circuits. A second gear train connected to the first gear train has one gear thereof provided with spaced actuating members for engaging the normally-closed switch and the double pole switch. When the cover is moved to the open position, the auxiliary film drive is started and the document drive operating circuit and the control circuit are rendered inoperative. At the end of a predetermined interval, the auxiliary drive is also rendered inoperative. When the cover is moved to the closed position, the auxiliary drive is again rendered operative and, at the end of a predetermined interval, is rendered inoperative and the document drive operating circuit and the control circuit are then rendered operative.

Reference is now made to the accompanying drawings wherein similar reference characters designate similar parts and wherein.

Figures 6, 7, 8, 9, 10, 11:
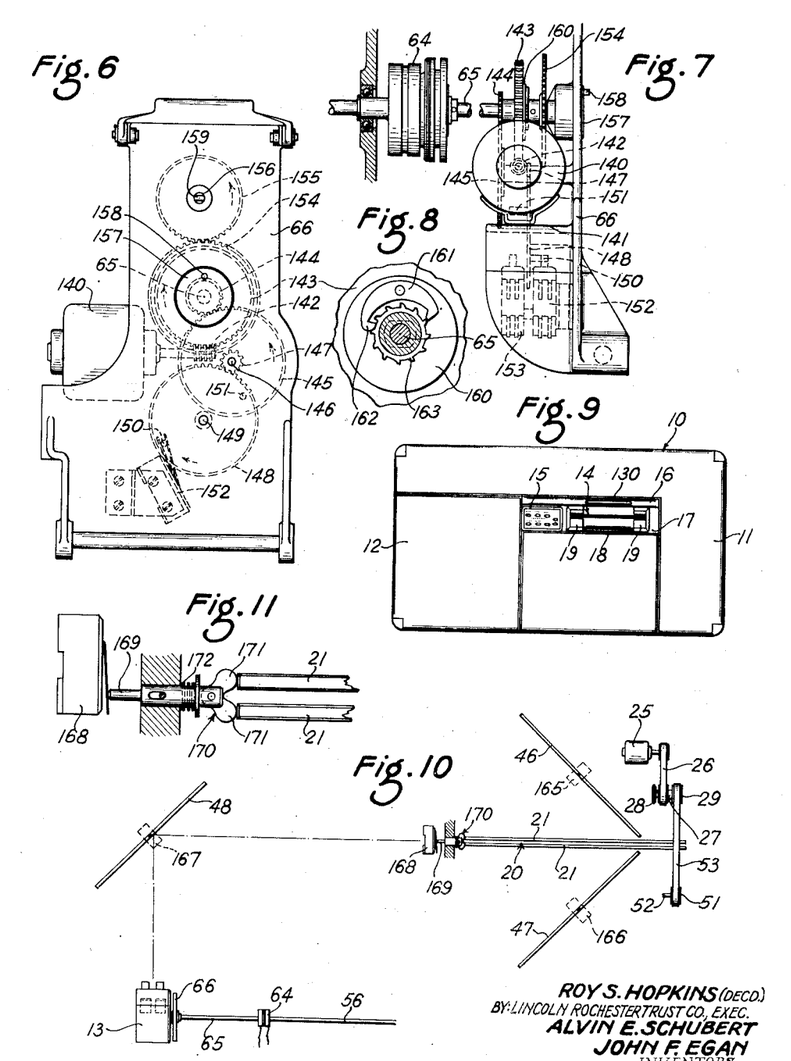
Fig. 6 is a side elevation of the hanger for the camera and showing the arrangement of parts for driving the film take-up shaft, the film drive connections for the camera, and the switch actuating members.
Fig. 7 is a partial rear elevation of the camera hanger.
Fig. 8 is a partial view showing the arrangement whereby the auxiliary film drive is connected to and disconnected from the drive shaft.
Fig. 9 is a plan view of the casing in which all of the mechanism is housed.
Fig. 10 is a diagrammatic plan view showing the mirror arrangement, the glass guides, and the switches operated thereby.
Fig. 11 is a detail view of the actuating member contacted by the glass guides for closing the glass guide switch.

In the illustrated embodiment of the invention, the entire operating mechanism is mounted in the casing 10, see Fig. 9, which has a top wall 11 which is divided into a number of sections one of which is the cover 12 which may be raised into an open position for inserting or removing the camera 13 and then lowered into a closed position. The feeding station 14, into which documents or the like are inserted in a vertical direction for photocopying within the machine, is also located on the top wall 11 and has a group of indicating members on a panel located adjacent thereto designated broadly by the numeral 15.

Figure 1:
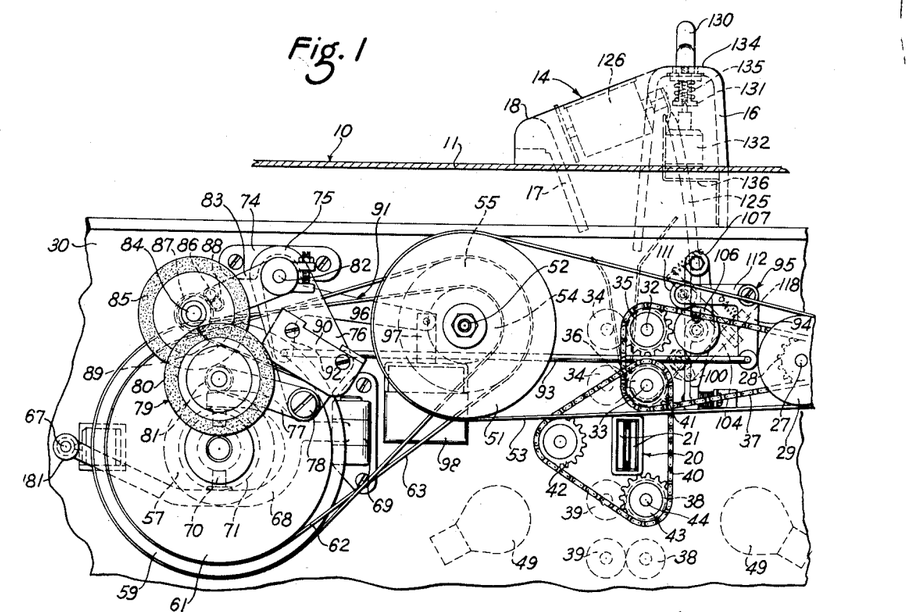
Fig. 1 is a partial side elevation of a duplex copying machine, with the casing removed, and showing the arrangement of the parts for providing automatic shut-down of the machine.
Figure 5:
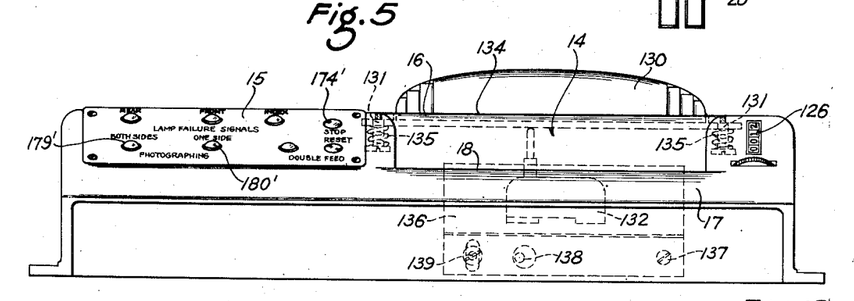
Fig. 5 is a front elevation of the feeding station on the top of the casing and showing the arrangement of parts for actuating the start switch.

The feeding station 14 comprises a formed metal plate 16, of the shape best shown in Figs. 1 and 5, which is secured to the mounting frames 30. A plate 17 having a curved flange 18 is also mounted on the top wall 11 and formed to join the plate 16 to form a rectangular aperture into which documents may be inserted vertically. The plates 16 and 17 are inclined towards each other to form a throat for directing the documents to the document drive means within the casing. The caps 19 are similar in shape to the section formed by the plates 16 and 17 and are adjustable to vary the width of the aperture in accordance with the size of the document being photographed.

The photographing station, designated broadly by the numeral 20, comprises two glass guides 21 between which the document is moved and which are in the photographic field of the camera 13. The glass guides 21 are adapted to be readily removed from the casing for the purpose of cleaning and replacement.

Figure 2:
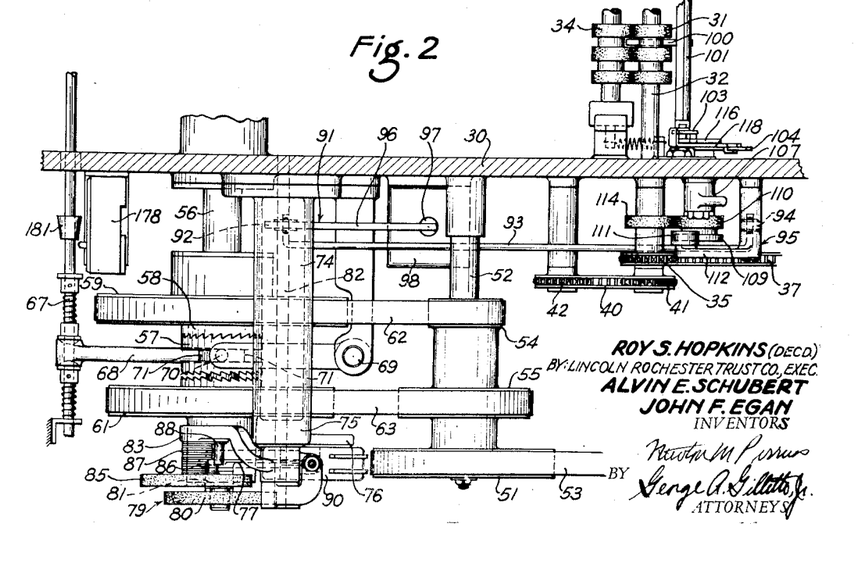
Fig. 2 is a partial plan view showing the relation of the parts shown in Fig. 1.
Figure 3:
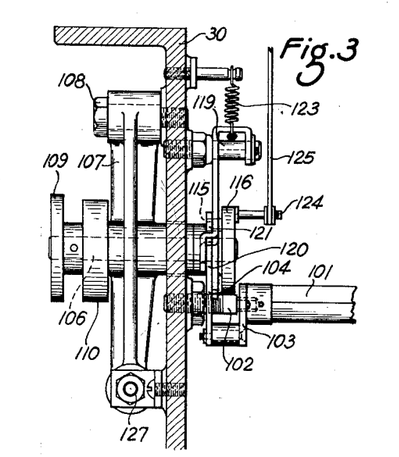
Fig. 3 is a rear elevation, on a larger scale, of the actuating means shown in Fig. 1.
Figure 4:
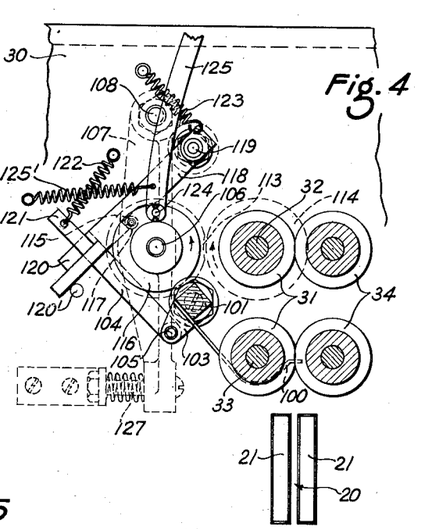
Fig. 4 is a side elevation of the actuating mechanism shown in Fig. 3.

The drive means for moving the document from the feeding station 14 past the photographing station 20, see Figs. 1, 2, and 10, comprises a motor 25 which is connected by means of a belt 26 to the shaft 27 for driving the sprocket 28 and the pulley 29 thereon. The shaft 27 is journalled in one of the spaced mounting frames 30 which are mounted in the casing 10 and which support the entire operating mechanism. A plurality of rubber-covered drive rolls 31 are secured to the shafts 32 and 33 and have in spring biased intimate contact therewith a plurality of rubber-covered driven rolls 34. The rolls 31 and 34, as shown in Figs. 1, 2, and 4, are located between the feeding station 14 and the glass guides 21 and serve to move the document into the photographing station. The shafts 32 and 33 have fixed thereto sprockets 35 and 36, respectively, which are driven by the chain 37 connecting them with the sprocket 28. A plurality of rubber-covered drive rolls 38 are located below the glass guides 21 and have driven rolls 39 in contact therewith for moving the document from the photographing station 20 into a suitable receptacle in the bottom of the casing 10, not shown. The rolls 38 are driven from the shaft 33 through the chain 40 which encircles the sprocket 41 on the shaft 33, the idler sprocket 42, and the sprocket 43 on the shaft 44. The shaft 44 is also provided with an additional sprocket, not shown, for driving the next set of drive rolls. Reference may be made to the patent application Ser. No. 707,946 filed November 5, 1946, in the names of John F. Egan and George S. Jones for a more detailed description of the drive means.

The reflecting means comprises the mirrors 46 and 47 located adjacent and on each side of the photographing station 20, and the mirror 48 which is located between the mirrors 46 and 47 and the camera 13, as shown in Fig. 9. The mirrors 46 and 47 are angularly disposed with respect to the photographing station 20 for directing the reflected obverse and reverse images of the document to the mirror 48. The mirror 48 then reflects the document images into the camera 13. A plurality of lamps 49 are arranged on each side of the guides 21, as shown in Fig. 1.

While Fig. 9 discloses an arrangement for photographing both sides of a document, it is possible to utilize a second camera and only one bank of lamps for photographing only one side of the document. The camera 13, as shown in Fig. 9 could also be of the type for taking only one exposure instead of two exposures, as shown.

The exposure station is the focal plane of the camera objective through which the light-sensitive material or film must pass. Since this is well known practice in the art of camera making, only a diagrammatic representation of the camera 13 is shown in Fig. 10.

The camera 13 may be a conventional type camera or preferably one of the types described in the patent application Ser. No. 750,832, filed May 27, 1947, in the names of John F. Egan and George S. Jones, now Patent No. 2,552,266, issued May 8, 1951. In this application one camera is used for photographing both sides of the document in which the camera objective is located centrally with respect to the film, and for photographing only one side of the document, a second camera is used in which the camera objective is offset with respect to the center of the film. The movement of the light-sensitive material or film is the same as that for any conventional camera in which the film is moved from a supply spool past the exposure station and onto a take-up spool.

The second drive means for moving the light-sensitive material in synchronism with the document comprises pulley 29 which drives the pulley 51 on the shaft 52 by the belt 53, see Figs. 1, 2, and 9. The stub shaft 52 has keyed thereto the pulleys 54 and 55. A shaft 56 which extends across the machine has keyed thereto at an end a clutch member 57 with two serrated engaging faces. The clutch member 57 is adapted to normally engage the serrated hub 58 on the pulley 59 and, selectively, the serrated hub 60 on the pulley 61. The pulleys 59 and 61 are loosely mounted on the shaft 56 and connected to the pulleys 54 and 55, respectively, by the belts 62 and 63. Since the pulleys 59 and 61 are loosely mounted, in the shaft 56, both pulleys are continuously rotated as long as the motor 25 is energized, regardless of the position of the clutch member 57. The other end of the shaft 56 terminates in the magnetic clutch 64. The other side of the magnetic clutch 64 is mounted on the shaft 65 which terminates in the hanger 66. The shaft 65 has fixed thereto a plate 67 which carries an eccentric pin 68 for engaging the film drive roller. With the clutch member 57 normally in engagement with the hub 58 of the pulley 59, the ratio of the drive is such that the film is moved in synchronism with the document for photographing both sides of the document.

When it is desired to photograph only one side of a document, a second camera is positioned on the hanger 66 and actuates the rod 67, as is more fully disclosed in the above-mentioned applications. The rod 67 is moved downwardly, as viewed in Fig. 2, thereby moving the yoke 68 in a counterclockwise direction about its pivot post 69. The yoke 67 is provided with studs 70 which engage the reduced portion 71 of the clutch member 57 to move it into engagement with the hub 60 of the pulley 61. In this way, the pulley 59 is free to rotate, and the shaft 56 is now rotated by the pulley 61 and driven at a faster rate of speed. When only one side of the document is being photographed, the image on the film is larger than when both sides are being photographed, and as a result, the film has to be moved at an increased rate with respect to the movement of the document.

The control means for shutting down the document and film drive means comprises a support member 74, see Fig. 2, mounted on the frame 30 and having an extension terminating in a bearing portion 75 and an overhang 76. An arm 77 is pivotally secured at 78 to the overhang 76 and carries at the end thereof a drive roll 79. The roll 79 comprises a large cork-covered wheel 80 in frictional engagement with a reduced extension of the pulley 61 and a small wheel 81 which is concentric with the wheel 80, both of said wheels being free to move toward the shaft 56. A shaft 82 is journalled in the frame 30 and portion 75 and has fixed thereto an arm 83 which carries a stub shaft 84 for a second cork-covered drive roll 85 which normally frictionally engages the small wheel 81 and is spring-biased towards said wheel. The drive roll 85 carries a pin 86 around which one end of the coil spring 87 on the shaft 82 is wrapped. A second pin 88 is fixed to the arm 83 and secures the other end of the spring 87. Since the wheel 80 is in engagement with the extension on the pulley 61, the wheels 80 and 81 will be rotated as a unit and will drive the wheel 85 at a constant speed irrespective of the pulley engaged by the member 57. As the wheel 85 is rotated in a counterclockwise direction, the pins 86 and 88 are separated and the spring 87 is wound in tension. As the pin 86 and wheel 85 are rotated the pin finally reaches the point where it contacts the arm 89 of the switch 90 mounted on the overhang 76 to open the motor circuit to be described hereinafter. A bell crank lever 91 is fixed to the shaft 82 and has one arm 92 thereof connected by the link 93 to the arm 94 of the lever 95 and the other arm 96 pivotally connected to the armature 97 of the solenoid 98.

The actuating means for resetting the control means comprises a plurality of document-actuated members 100 extending into the path of the document, as shown in Figs. 2 and 4, and which are secured to the rod 101 pivotally mounted between the frame members 30 by studs 102. The rod 101 has fixed to one end thereof a link 103 which has a lever 104 pivotally mounted at 105 thereto. A shaft 106 is journalled in a bearing member 107 pivotally mounted to the frame 30 by the stud 108 and carries a cam 109, a cork-covered drive member 110, and the arresting means for holding the drive member 110 against rotation. The cam 109 is adapted to be engaged by the follower roll 111 on the arm 112 of the lever 95. The cork-covered drive roll 110 is provided with a clearance portion 113 and when released begins to move due to spring 125' until it frictionally engages the roll 114 on the shaft 32 for driving the shaft 106.

The arresting means for holding the drive member 110 against rotation comprises a pin 115 on the disc 116 which abuts the recessed portion 117 of the lever 118 pivotally mounted on the frame 30 by means of the stud 119. The end of the lever 118 is split and has a portion 120 formed to straddle the reduced portion 121 of the lever 104. The lever 104 is held against the portion 120 by the spring 122, and the lever 118 is held against the pin 115 by the spring 123. The disc 116 also carries a stud 124 to which is secured one end of a lever 125 having its other end connected to the counter 126. The bearing member 107 is adjusted by means of the stud 127 for varying the center distance and hence the clearance between the drive member 110 and the roll 114.

The means for resetting the control means comprises a start bar 130 mounted on the studs 131 secured to the under side of the plate 16 and a switch 132. The start bar 130 is free to move vertically on the studs 131 and is held adjacent the top wall 134 of the plate 16 by the springs 135. The aperture in the top wall 134 is sufficiently large to permit tilting of the bar 130 either to the right or to the left, as viewed in Figs. 1 or 5. This arrangement permits actuating the switch 132 by either tilting or depressing the bar 130. The switch 132 is mounted on the bracket 136 which is pivotally mounted on the plate 16 by means of the screw 137 and adjusted with respect to the bar 130 by the eccentric pin 138 and locked in position by the screw 139.

The auxiliary drive means provides for rotating the shaft 65 so as to wind film onto the take-up reel before the camera has been withdrawn from the casing 10, or after it has been replaced in the casing 10. It has been found that approximately eight (8) turns of the shaft 65 are necessary to wind off a sufficient amount of film to remove the film that has been fogged in loading the camera and to protect the last exposure prior to removal of the camera from the casing 10. In the present invention, the motor 140 is mounted on the shelf 141 of the hanger 66 and carries a worm 142 which engages the worm wheel 143 freely mounted on the shaft 55. The worm wheel 143 has pinned thereto a pinion 144 which meshes with the gear 145 freely mounted on the stub shaft 146. The gear 145 has fixed thereto a pinion 147 which meshes with the gear 148 on the shaft 149, said gear 148 having actuating members 150 and 151 on opposite sides thereof and diametrically located for engaging the arms of the double-pole switch 152 and normally-closed switch 153, respectively. The gear 154 is fixed to the shaft 65 and meshes with the gear 155 to drive the shaft 156 which operatively connects to the take-up reel shaft of the camera. In normal operation, that is, while documents are being photographed, the document moves the fingers 100 which actuate a switch for energizing the magnetic clutch 64 to drive the shaft 65 which in turn drives the plate 157 and the eccentric pin 158 thereon. The pin 158 engages the film drive roll in the camera for moving the film, and the tongue 159 on the shaft 156 engages the film take-up shaft and is driven by the gears 154 and 155. When the auxiliary drive means is operated, the shaft 65 is stationary, as will be more fully disclosed hereinafter; however, in order to rotate the shafts 65 and 156, the worm-wheel 143 is provided with a plate 160 on which is pivotally mounted a pawl 161 having a nose 162 for engaging the ratchet 163 formed integral with the gear 154, see Fig. 8. As the worm-wheel 143 is rotated the nose 162 picks up the ratchet 163 and rotates the gear 154, shaft 65 and through gear 155 the shaft 156. In normal operation, as the ratchet 163 rotates with the shaft 65, the pawl is pivoted out of the way as the ratchet teeth strike the nose 162.

It will be noted, from Fig. 10, that the mirrors, 46, 47, and 48 have a switch 165, 166, and 167 thereunder respectively. These normally-open switches are closed when each mirror is properly positioned. The glass guides must also be properly positioned to close the normally-open switch 168. In order to insure that both of the glass guides are in position, a switch actuating member 169 is provided with a pivoted member 170 having an engaging portion 171 for each glass guide. It is only when both glass guides are positioned properly that the member 169 is moved against the spring 172 to close the switch 168. The mirrors 46, 47, and 48 are also provided with severed corners which cooperate with protuberances on the mounting plate to prevent their being mounted with the back face forward.

Figures 12, 13:
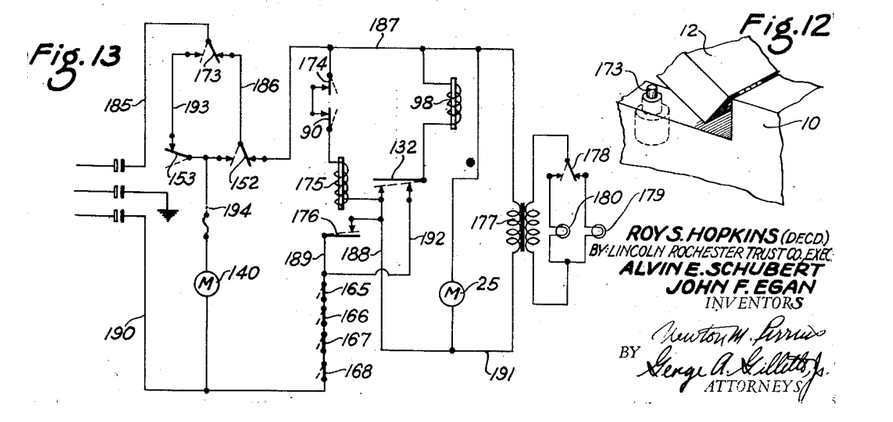
Fig. 12 is a detail perspective view of the cover-actuated switch.
Fig. 13 is a wiring diagram of the circuits involved in the present invention.

The wiring diagram shown in Fig. 12 shows the relation of the various circuits as the machine photographs both sides of the document with the cover 10 in the closed position. The cover 10 actuates the double-pole cover switch 173 upon being moved to the open or closed position. The auxiliary drive circuit includes the cover switch 173, one pole of the double-pole switch 152, the normally-closed switch 153, and the motor 140. The normally-closed switch 153 and one pole of the switch 152 are in series-parallel circuit with the switch 173 and the motor 140. The document drive circuit comprises the other pole of the switch 152, the motor 25, the start switch 132, and the solenoid 98. The control circuit comprises a normally-closed stop switch 174, the switch 90, a solenoid 175, and the normally-open holding switch 176. It will be noted that the switches 165, 166, 167, and 168 are in series circuit with the film drive circuit and the control circuit. In order to indicate to the operator whether both or only one side of the document is being photographed, an indicating circuit is provided which includes the transformer 177, a double-pole switch 178, a lamp 179 for indicating when both sides of the document are being photographed and a lamp 180 in parallel with the lamp 179 and for indicating that only one side of the document is being photographed. The switch 178 is normally in the position indicated by the full lines in Fig. 12 and moved to the dotted line position by the sleeve 131 on the rod 67 which is moved when the camera for photographing only one side of the document is positioned on the hanger 66.

The operation of the above-described mechanism in conjunction with the electrical circuits will now be described. If it is assumed that the machine had been stopped with the parts in the positions as shown in the various figures of the drawings, the operation is as follows: The operator depresses or tilts the start bar 130 thereby moving the switch 132 to the dotted line position shown in Fig. 13 to energize the motor 25, and the solenoid 175 for holding switch 176 in the dotted line or closed position. The current flow is then through the line 185 to the switch 173, through the lines 186 and 187, through the switches 174 and 90 and the solenoid 175 to the line 188, through the switch 176 to the line 189, and through switches 165, 166, 167, and 168 to the line 190. This circuit is the control circuit for maintaining the motor 25 energized. The drive operating circuit when the bar 130 is actuated is through the line 185 to the switch 173, the line 186 and 187 to the motor 25 and the line 191, through the line 188 to the switch 132, through the line 192 to the line 189, and through the switches 165, 166, 167, and 168 to the line 190. At the instant the bar 130 is released, the drive operating circuit through the switch 176 remains closed as long as the solenoid 175 remains energized. At this point it can be readily appreciated that if for any reason one of the mirrors 46, 47, and 48 or the glass guides 21 have not been positioned properly, the control circuit and the drive operating circuit will not function.

With the motor 25 energized rolls 31 are rotated through the belt 26 and the chain 37, and the lower rolls 38 are rotated through the chain 40. At the same time and since the clutch member 57 is engaged with the hub 58 of the pulley 59, the shaft 56 is rotated through the belts 62 and 53, and the pulley 61 is freely rotated on the shaft 56 by the belt 63. At the instant the pulley 61 commences to rotate, the motion is translated to the roll 81 and thence to the roll 85. As the roll 85 rotates, the pin 86 moves away from the pin 88 in a counterclockwise direction, thereby tensioning the spring 87. If a document is now inserted in the feeding station 14, it is directed toward the rolls 31 and 34 and then picked up by said rolls for moving it toward the photographing station 20. Before entering the photography station, the document strikes the actuating members 100, which are in the path of the document, to rotate the rod 101 and the link 103 in a clockwise direction, see Fig. 4. Movement of the link 103 moves the lever 104 and the lever 118 about its stud 119 so that the recess 117 releases the pin 115, the lever 104 being hooked to the lever 118 by the shoulder formed by the reduced portion 121 engaging the formed portion 120 of the lever 118 and held thereagainst by the spring 122. The spring 125' which is under tension imparts a starting motion to the shaft 106 through the disk 116 so that the clearance portion 113 of the roll 110 is rotated a slight amount to permit the periphery of the roll 110 to frictionally engage the roll 114 on the shaft 32. The disk 116 and the pin 115 are then rotated through one revolution. The rotation of the disc 116 is limited to one revolution due to the pin 115 striking the lever 104 to release it from the lever 118 and permitting the lever 118 to be brought back against the pin 120' where the recess 117 will be in the path of the pin 115 to arrest it as it is rotated with the disk 116. Since the lever 104 is pivotally mounted on the link 103, the pin 115 striking the lever 104 has no effect on the member 100 which may be still held out of its normal position by the document. The lever 104 is returned to its engaging position with the lever 118 only after the document has released the member 100.

As the shaft 106 is rotated, the cam 109 is rotated therewith to raise the follower and rotate the lever 95 in a clockwise direction. This motion is imparted by the link 93 to rotate the lever 91 and the shaft 82 in the same direction. As the shaft 82 is rotated the arm 83 is also rotated to remove the roll 85 from engagement with the wheel 82 thereby permitting the spring 87 to return the pin 86 against the pin 88. At the completion of the one revolution of the shaft 106, the roll 85 is again in contact with the wheel 81 and the pin 86 again moves away from the pin 88.

If for any reason the operator fails to insert a document into the feeding station 14, the pin 86 continues to move away from the pin 88 until it contacts the arm 89 to open the switch 90. When the switch 90 is opened, the solenoid 175 is deenergized permitting the switch 176 to open and render the control circuit and drive operating circuit inoperative. The time required for the pin 86 to move from engagement with the pin 88 to engagement with the arm 89 of the switch 90 is the predetermined interval of idle operation. This period, which is approximately 90 seconds in length, is sufficiently long so that even a document somewhat larger than a legalsize document may be entirely photographed, and the next document inserted without any danger of the machine being automatically shut down. To restart the machine, it is only necessary to press or tilt the start bar 130 which closes the control circuit and drive operating circuit and also energizes the solenoid 98. As the solenoid is energized, the armature 97 is moved downward and through the arm 96 of the lever 91 rotates the shaft 82 and the arm 83 to remove the roll 85 from engagement with the wheel 81 to permit the spring 87 to return the pin 86 against the pin 88. When the pin 86 is released from the switch 90, it returns to its normally-closed position and the circuits are again operative. If for any reason it is desired to stop the machine while it is in normal operation, the switch 174 need only be opened momentarily by depressing the stop button 174' on the panel 15. As in the case when the switch 90 is opened by the pin 86, the start bar 130 must again be actuated to start the machine. The above-described arrangements render the machine inoperative if a predetermined interval elapses between successive documents and permits resetting of the mechanism controlling the length of the interval at any time during or after the predetermined interval.

When the cover 12 is raised to the open position, the switch 173 moves to the dotted line position, as shown in Fig. 13, to initiate the auxiliary film drive circuit and to render the control circuit and drive operating circuit inoperative. The auxiliary drive circuit is then through the line 185 to the switch 173, through the dotted line position of switch 173 to the line 193 and the switch 153 and to line 194, and through the line 194 to the motor 140 and the line 190. When the motor 140 is energized, the worm 142 drives the worm-wheel 143 and through the pawl 161 and ratchet 163 rotates the shaft 65 and the shaft 156, as described above, to drive the film roll and take-up shaft. The pinion 144 which rotates with the worm-wheel 143 rotates the gear 145, the pinion 147, and the gear 148. As the gear 148 is rotated, the switch-actuating member 150 allows the switch 152 to move to the dotted line position, as shown in Fig. 13. The predetermined interval of operation is determined by the time required for the actuating members 150 and 151 to exchange relative positions, depending on the position of the cover 12, which is closed when the parts are in the position shown in Fig. 6. This movement of either member through 180° requires approximately 90 seconds and when translated through the gear train 148, 147, 145, and 144 results in eight (8) revolutions of the shaft 65 to provide the predetermined length of film which is wound off. The switches 152 and 153 are located adjacent each side of the gear 148, and the members 150 and 151 are on opposite sides of the gears 148, as shown in Fig. 7. The gear 148 is rotated until the member 151 engages the switch 153, thereby opening said switch and rendering the auxiliary drive circuit inoperative. At this point, the camera may be removed from its position on the hanger 66 for reloading or inspection with the last exposure protected against fogging.

When the desired camera is replaced on the hanger 66, the cover 12 may be closed immediately, and as the cover is moved to its closed position, the switch 173 is moved back to the full-line position, as shown in Fig. 13. The auxiliary drive circuit is then through the line 185 to the switch 173, through the full-line position of the switch 173 and the line 186 to the switch 152, through the dotted line position of the switch 152 to the line 194 and the motor 140, and from the motor through the line 190. Since the switch 152 is in the dotted-line position, the drive operating circuit and control circuits are inoperative and actuation of the start bar 130 will not start the machine. As the motor 140 starts to drive the respective gear trains, the member 151 is moved out of engagement with the switch 153 to permit it to return to its full-line position. The shafts 65 and 156 are rotated in the same manner as described above until the actuating member 150 again engages the switch 151. When the member 150 engages the switch 151, the switch is moved to its full-line position thereby rendering the auxiliary drive circuit inoperative and the drive operating circuit and control circuit operative. The film that may possibly have been fogged in loading the camera has now been wound out of the exposure aperture of the camera and the machine may be started by actuating the start bar 130.

As explained in the above-mentioned application Serial No. 750,832, one camera is used for photographing both sides of the document and a second camera is used for photographing only one side of the document. When the second camera is placed on the hanger 66, the rod 67 is moved to pivot the yoke 68 and move the clutch member 57 into engagement with the hub 60 of the pulley 61 to drive the shaft 56 at an increased rate and in synchronism with the document.

In order to indicate to the operator which camera is in position on the hanger 66, a transformer 177 is connected across the lines 187 and 191, see Fig. 13, to provide a reduced voltage for an indicating circuit. The indicating circuit comprises a double-pole switch 178 and the lamps 179 and 180 which are in parallel. The switch 178 is normally in the full-line position, as indicated in Fig. 13, for normally maintaining the current flow through the lamp 179 to indicate at 179' on the panel 15 that both sides of the document are being photographed. As the rod 67 is moved when the second camera is positioned on the hanger 66, the sleeve 181 engages the switch 178 to move it to the dotted-line position for completing the circuit through the lamp 180 to indicate at 180' on the panel 15 that only one side of the document is being photographed.

While the above-described invention has been described as being adapted to a duplex type of machine in which the document image is reflected twice before entering the exposure station, it may very well be incorporated in a duplex machine where only one reflection of the document takes place, or in a drum-type of photographing machine in which only one side of a document is photographed. With the latter two types, the only difference will be in the number of mirror-actuated switches, but in either case a switch can still be employed which is adapted to be closed by the proper positioning of the glass guides. Also, since other modifications of the construction shown are possible, the scope of the invention is not to be limited to the illustrated embodiment but is defined by the appended claims.

We claim:

1. In an apparatus for photographically copying documents, the combination with a casing having a cover movable to an open and a closed position, a feeding station for the document, a photographing station in said casing for the document including document guide members, a drive means for moving the document from said feeding station past said guide members, an exposure station, reflecting means adjacent said photographing station for directing the reflected document images into said exposure station, a camera adapted to support a light-sensitive material in said exposure station, and a second drive means operatively connected to said first-mentioned drive means for moving said light-sensitive material in synchronism with the document, of a control means operatively connected to and movable by said second drive means from an inoperative position to an operative position for automatic shut-down of said drive means after a predetermined interval has elapsed between documents inserted in said feeding station, an actuating means operated by a document moving into said photographing station and operatively connected to said control means for resetting said control means to said inoperative position before the predetermined interval has elapsed, a drive operating circuit including a start switch, a reset solenoid, and a motor, a control circuit including a holding solenoid and a holding switch, said holding solenoid and said reset solenoid being energized by the closing of said start switch to respectively close said holding switch to maintain said drive operating circuit closed and to reset said control means to said inoperative position after the predetermined interval has elapsed, an auxiliary drive means operatively connected to said camera and adapted to move a predetermined length of said material past said exposure station, an auxiliary drive circuit including a motor, a normally-closed switch and one pole of a double-pole switch in series-parallel circuit with said motor, a cover switch connected through the other pole of said double-pole switch to said drive operating circuit and said control circuit, connected to said auxiliary drive circuit and adapted upon movement of said cover to the open or closed position to close said auxiliary drive circuit for moving said material, and means associated with said auxiliary drive means and adapted when the cover is moved to the open position to close said other pole of said double-pole switch in said auxiliary drive circuit to render said drive operating circuit and said control circuit inoperative and to open said normally-closed switch at the end of said predetermined length of material to render said auxiliary drive circuit inoperative and when said cover is moved to the closed position to permit said normally-closed switch to close and to close said one pole of said double-pole switch at the end of said predetermined length of material to render said auxiliary drive circuit inoperative and to render said drive operating circuit and said control circuit operative.

2. In an apparatus for photographically copying a document, the combination with a feeding station for the document, a photographing station for the document, drive means for moving the document from said feeding station past said photographing station, an exposure station adapted to support a light-sensitive material, and a second drive means operatively connected to said first-mentioned drive means for moving said light-sensitive material in synchronism with the document, of a control means operatively connected to and movable by said second drive means from an inoperative position to an operative position only when said second drive means is inoperative to move said light-sensitive material for automatic shut-down of said drive means after a predetermined interval and adapted to be reset to said inoperative position at any time before the expiration of said interval, and an actuating means operated by a document moving into said photographing station and operatively connected to said control means for resetting said control means to said inoperative position before the predetermined interval has elapsed.

3. In an apparatus for photographically copying a document, the combination with a feeding station for the document, a photographing station for the document, drive means for moving the document from said feeding station past said photographing station, an exposure station adapted to support a light-sensitive material, and a second drive means operatively connected to said first-mentioned drive means for moving said light-sensitive material in synchronism with the document, of a control means operatively connected to and movable by said second drive means from an inoperative position to an operative position only when said second drive means is inoperative to move said light-sensitive material for automatic shut-down of said drive means after a predetermined interval has elapsed and adapted to be reset to said inoperative position, and means adjacent said feeding station and operatively connected to said control means for resetting said control means to said inoperative position after the predetermined interval has elapsed.

4. In an apparatus for photographically copying a document, the combination with a feeding station for the document, a photographing station for the document, drive means for moving the document from said feeding station past said photographing station, an exposure station adapted to support a light-sensitive material, and a second drive means operatively connected to said first-mentioned drive means for moving said light-sensitive material in synchronism with the document, of a control means operatively connected to and movable by said second drive means from an inoperative position to an operative position only when said second drive means is inoperative to move said light-sensitive material for automatic shut-down of said drive means after a predetermined interval and adapted to be reset to said inoperative position, an actuating means operated by a document moving into said photographing station for resetting said control means to said inoperative position before the predetermined interval has elapsed, and means adjacent said feeding station and operatively connected to said control means for resetting said control means to said inoperative position after the predetermined interval has elapsed.

5. In an apparatus for photographically copying a document, the combination with a feeding station for the document, a photographing station for the document, drive means for moving the document from said feeding station past said photographing station, an exposure station adapted to support a light-sensitive material, and a second drive means operatively connected to said first-mentioned drive means for moving said light-sensitive material in synchronism with the document, of a control means adapted to be reset and including a support member, a drive roll in engagement with said second drive means and pivotally mounted on said support member, a second drive roll normally in engagement with said first drive roll and pivotally mounted on said support member, and a switch means mounted on said support member and adapted after a predetermined interval to be actuated to automatically shut down said drive means, a switch-actuating means associated with said second drive roll and adapted to be rotated from a normal position to a switch-actuating position for providing a predetermined interval of operation, an actuating means operated by a document moving into said photographing station and operatively connected to said control means for disengaging said second drive roll from said first drive roll before said predetermined interval has elapsed, and means associated with said second drive roll and switch-actuating means for returning said switch-actuating means to its normal position when said second drive roll is in the disengaged position.

6. In an apparatus for photographically copying a document, the combination with a feeding station for the document, a photographing station for the document, drive means for moving the document from said feeding station past said photographing station, an exposure station adapted to support a light-sensitive material, and a second drive means operatively connected to said first-mentioned drive means for moving said light-sensitive material in synchronism with the document, of a control means adapted to be reset including a support member, a drive roll in frictional engagement with said second drive means and pivotally mounted on said support member, a second drive roll normally in frictional engagement with said first drive roll and pivotally mounted on said support member, and a switch means mounted on said support member and adapted after a predetermined interval to be actuated to automatically shut down said drive means, a switch-actuating means associated with said second drive roll and adapted to be rotated from a normal position to a switch-actuating position for providing a predetermined interval of operation and adapted to be reset at any time, a reset means operatively connected to said second drive roll for removing said second drive roll from frictional engagement with said first drive roll, and an actuating means operated by a document moving into said photographing station and operatively connected to said reset means for removing said second drive roll from engagement with said first drive roll before said predetermined interval has elapsed.

7. In an apparatus for photographically copying a document, the combination with a feeding station for the document, a photographing station for the document, drive means for moving the document from said feeding station past said photographing station, an exposure station adapted to support a light-sensitive material, and a second drive means operatively connected to said first-mentioned drive means for moving said light-sensitive material in synchronism with the document, of a control means adapted to be reset including a support member, a drive roll in frictional engagement with said second drive means and pivotally mounted on said support member, a second drive roll normally in frictional engagement with said first drive roll and pivotally mounted on said support member, and a switch means mounted on said support member and adapted after a predetermined interval to be actuated to automatically shut down said drive means, a switch-actuating means associated with said second drive roll and adapted to be rotated from a normal position to a switch-actuating position for providing a predetermined interval of operation and adapted to be reset at any time, a reset means operatively connected to said second drive roll for removing said second drive roll from frictional engagement with said first drive roll, an actuating means operated by a document moving into said photographing station and operatively connected to said reset means for removing said second drive roll from engagement with said first drive roll before said predetermined interval has elapsed, means adjacent said feeding station and operatively connected to said reset means for disengaging said second drive roll from said first drive roll after the predetermined interval of operation has elapsed, and means associated with said second drive roll for returning said switch-actuating means to its normal position when said second drive roll is disengaged from said first drive roll.

8. In an apparatus for photographically copying a document, the combination with a feeding station for the document, a photographing station for the document, drive means for moving the document from said feeding station past said photographing station, an exposure station adapted to support a light-sensitive material, and a second drive means operatively connected to said first-mentioned drive means for moving said light-sensitive material in synchronism with the document, of a control means adapted to be reset including a support member, a drive roll in frictional engagement with said second drive means and pivotally mounted on said support member, a second drive roll normally in frictional engagement with said first drive roll and pivotally mounted on said support member, and a switch means mounted on said support member and adapted after a predetermined interval to be actuated to automatically shut down said drive means, a switch-actuating means associated with said second drive roll and adapted to be moved from a normal position to a switch-actuating position for providing a predetermined interval of operation between successive documents and adapted to be reset at any time, a reset means operatively connected to said second drive roll for removing said second drive roll from frictional engagement with said first drive roll, an actuating means operated by a document moving into said photographing station and operatively connected to said reset means for removing said second drive roll from engagement with said first drive roll before said predetermined interval has elapsed, and means including an actuating bar adjacent said feeding station, a second switch adapted to be closed by actuation of said bar, and a solenoid operatively connected to said reset means and energized by the closing of said second switch for disengaging said second drive roll from said first drive roll only after said predetermined interval has elapsed to permit said switch-actuating means to be returned to its normal position.

9. In an apparatus for photographically copying a document, the combination with a feeding station for the document, a photographing station for the document, drive means for moving the document from said feeding station past said photographing station, an exposure station adapted to support a light-sensitive material, and a second drive means operatively connected to said first-mentioned drive means for moving said light-sensitive material in synchronism with the document, of a control means operatively connected to said second drive means for automatic shut-down of said drive means after a predetermined interval and adapted to be reset, an actuating means including a cam member and a follower associated therewith operatively connected to said control means for resetting said control means, a drive member engaging said drive means for rotating said cam member, an arresting means for holding said drive member against rotation, and means operatively connected to said arresting means and actuated by a document moving into said photographic station for releasing said arresting means to permit said drive member and cam member to make a complete revolution for resetting said control means.

10. In an apparatus for photographically copying a document, the combination with a feeding station for the document, a photographing station for the document, drive means for moving the document from said feeding station past said photographing station, an exposure station adapted to support a light-sensitive material, and a second drive means operatively connected to said first-mentioned drive means for moving said light-sensitive material in synchronism with the document, of a control means operatively connected to said second drive means for automatic shut-down of said drive means after a predetermined interval and adapted to be reset at any time during or after the predetermined interval, an actuating means including a cam member and a follower associated therewith operatively connected to said control means for resetting said control means, a drive member normally spaced from said drive means and adapted to frictionally engage said drive means for rotating said cam member, an arresting means for holding said drive member in the normally spaced position, and means operatively connected to said arresting means and actuated by a document moving into said photographic station for releasing said arresting means to permit said drive member to move said cam member through a complete revolution for resetting said control means before the predetermined interval has elapsed.

11. In an apparatus for photographically copying a document, the combination with a feeding station for the document, a photographing station for the document, drive means for moving the document from said feeding station past said photographing station, an exposure station adapted to support a light-sensitive material, and a second drive means operatively connected to said first-mentioned drive means for moving said light-sensitive material in synchronism with the document, of a control means adapted to be reset including a support member, a drive roll in engagement with said second drive means and pivotally mounted on said support member, a second drive roll normally in engagement with said first drive roll and pivotally mounted on said support member, and a switch means mounted on said support member and adapted after a predetermined interval to be actuated to automatically shut down said drive means, a switch-actuating means associated with said second drive roll and adapted to be rotated from a normal position to a switch-actuating position for providing a predetermined interval of operation, an actuating means including a cam member and a follower associated therewith operatively connected to said control means for resetting said control means, a drive member engaging said drive means for rotating said cam member, an arresting means for holding said drive member against rotation, means operatively connected to said arresting means and actuated by a document moving into said photographing station for releasing said arresting means to permit said drive member and cam member to make a complete revolution for disengaging said second drive roll from said first drive roll to reset said control means before the predetermined interval has elapsed, and means associated with said second drive roll for returning said switch-actuating means to its normal position when said second drive roll is in the disengaged position.

12. In an apparatus for photographically copying a document, the combination with a feeding station for the document, a photographing station for the document, drive means for moving the document from said feeding station past said photographing station, an exposure station adapted to support light-sensitive material, and a second drive means operatively connected to said first-mentioned drive means for moving said light-sensitive material in synchronism with the document, of a control means adapted to be reset including a support member, a drive roll in frictional engagement with said second drive means and pivotally mounted on said support member, a second drive roll normally in frictional engagement with said first drive roll and pivotally mounted on said support member, and a switch means mounted on said support member and adapted after a predetermined interval to be actuated to automatically shut down said drive means, a switch-actuating means associated with said second drive roll and adapted to be rotated from a normal position to a switch-actuating position for providing a predetermined interval of operation and adapted to be reset at any time, reset means operatively connected to said second drive roll for removing said second drive roll from frictional engagement with said first drive roll, actuating means including a cam member and a follower associated therewith operatively connected to said reset means for disengaging said second drive roll from said first drive roll, a drive member engaging said drive means for rotating said cam member, an arresting means for holding said drive member against rotation, and means operatively connected to said arresting means and actuated by a document moving into said photographing station for releasing said arresting means to permit said drive member and cam member to make a complete revolution for disengaging said second drive roll from said first drive roll to permit said switch-actuating means to return to its normal position.

13. In an apparatus for photographically copying a document, the combination with a feeding station for the document, a photographing station for the document, drive means for moving the document from said feeding station past said photographing station, an exposure station adapted to support a light-sensitive material, and a second drive means operatively connected to said first-mentioned drive means for moving said light-sensitive material in synchronism with the document, of a control means adapted to be reset including a support member, a drive roll in frictional engagement with said second drive means and pivotally mounted on said support member, a second drive roll in frictional engagement with said first drive roll and pivotally mounted on said support member, and a switch means mounted on said support member and adapted after a predetermined interval has elapsed between successive documents, to be actuated to automatically shut down said drive means, a switch-actuating means associated with said second drive roll and adapted to be rotated from a normal position to a switch-actuating position for providing a predetermined interval of operation and to be reset at any time during or after the predetermined interval, reset means operatively connected to said second drive roll for removing said second drive roll from frictional engagement with said first drive roll, actuating means including a cam member and a follower associated therewith operatively connected to said reset means for disengaging said second drive roll from said first drive roll, a drive member normally spaced from said drive means and adapted to frictionally engage said drive means for rotating said cam member, an arresting means for holding said drive member against rotation and in the normally spaced position, means operatively connected to said arresting means and actuated by a document moving into said photographing station for releasing said arresting means to permit said drive member and cam member to make a complete revolution for transmitting through said follower to said reset means the movement necessary to disengage said second drive roll from said first drive roll to permit said switch actuating means to return to its normal position before the predetermined interval has elapsed, means associated with said second drive roll for returning said switch-actuating means to its normal position when said second drive roll is in a disengaged position, and means adjacent said feeding station operatively connected to said reset means for disengaging said second drive roll from said first drive roll after the predetermined interval of operation has elapsed to permit said switch-actuating means to return to its normal position.

14. In an apparatus for photographically copying a document, the combination with a feeding station for the document, a photographing station for the document, drive means for moving the document from said feeding station past said photographing station, an exposure station adapted to support a light-sensitive material, and a second drive means operatively connected to said first-mentioned drive means for moving said light-sensitive material in synchronism with the document, of a control means adapted to be reset including a support member, a drive roll in frictional engagement with said second drive means and pivotally mounted on said support member, a second drive roll in frictional engagement with said first drive roll and pivotally mounted on said support member, and a switch means mounted on said support member and adapted after a predetermined interval has elapsed between successive documents to be actuated to automatically shut down said drive means, a switch-actuating means associated with said second drive roll and adapted to be rotated from a normal position to a switch-actuating position for providing a predetermined interval of operation and to be reset at any time during or after the predetermined interval, reset means operatively connected to said second drive roll for removing said second drive roll from frictional engagement with said first drive roll, actuating means including a cam member and a follower associated therewith operatively connected to said reset means for disengaging said second drive roll from said first drive roll, a drive member normally spaced from said drive means and adapted to frictionally engage said drive means for rotating said cam member, an arresting means for holding said drive member against rotation and in the normally spaced position, means operatively connected to said arresting means and actuated by a document moving into said photographing station for releasing said arresting means to permit said drive member and cam member to make a complete revolution for transmitting through said follower to said reset means the movement necessary to disengage said second drive roll from said first drive roll to permit said switch-actuating means to return to its normal position before the predetermined interval has elapsed, and means including an actuating bar adjacent said feeding station, a second switch adapted to be closed by actuation of said bar, and a solenoid operatively connected to said reset means and energized by the closing of said second switch for disengaging said second drive roll from said first drive roll only after said predetermined interval has elapsed to permit said switch-actuating means to be returned to its normal position.

15. In an apparatus for photographically copying a document, the combination with a feeding station for the document, a photographing station for the document, drive means for moving the document from said feeding station past said photographing station, an exposure station adapted to support a light-sensitive material, and a second drive means operatively connected to said first-mentioned drive means for moving said light-sensitive material in synchronism with the document, of a control means operatively connected to said second drive means for automatic shut-down of said drive means after a predetermined interval and adapted to be reset, an actuating means including a cam member and a follower associated therewith operatively connected to said control means for resetting said control means before the predetermined interval has elapsed, a drive member engaging said drive means for rotating said cam member, an arresting means for holding said drive member against rotation, means operatively connected to said arresting means and actuated by a document moving into said photographing station for releasing said arresting means to permit said drive member and cam member to make a complete revolution for resetting said control means before the predetermined interval has elapsed, and means adjacent said feeding station and operatively connected to control means for resetting said control means after the predetermined interval has elapsed.

16. In an apparatus for photographically copying a document, the combination with a feeding station for the document, a photographing station for the document, drive means for moving the document from said feeding station past said photographing station, an exposure station adapted to support a light-sensitive material, and a second drive means operatively connected to said first-mentioned drive means for moving said light-sensitive material in synchronism with the document, of a control means operatively connected to said second drive means for automatic shut-down of said drive means after a predetermined interval has elapsed between successive documents and adapted to be reset at any time, an actuating means including a cam member and a follower associated therewith operatively connected to said control means for resetting said control means before the predetermined interval has elapsed, a drive member normally spaced from said drive means and adapted to frictionally engage said drive means for rotating said cam member, an arresting means for holding said drive member against rotation and in the normally spaced position, means operatively connected to said arresting means and actuated by a document moving into said photographing station for releasing said arresting means to permit said drive member and cam member to make a complete revolution for transmitting through said follower to said control means the movement for resetting said control means, and means including an actuating bar adjacent said feeding station, a switch adapted to be closed upon the actuation of said bar, and a solenoid operatively connected to said control means and energized by the closing of said switch for resetting said control means after the predetermined interval has elapsed.

17. In an apparatus for photographically copying documents, the combination with a casing having a cover movable to an open or closed position, a photographing station in said casing for the document, a drive means for moving the document past said photographing station, an exposure station, a camera adapted to support a light-sensitive film in said exposure station, and a second drive means operatively connected to said first-mentioned drive means and for moving said film in synchronism with the document, of a drive operating circuit including one pole of a double-pole switch, an auxiliary drive means operatively connected to said camera for moving a predetermined length of film past said exposure aperture, and auxiliary drive circuit including a motor operatively connected to said auxiliary drive means, a normally-closed switch, and the other pole of said double-pole switch in series-parallel circuit with said motor, a cover switch connected through said one pole of said double-pole switch to said drive operating circuit and connected to said auxiliary drive circuit and for normally maintaining said drive operating circuit operative and adapted upon movement of said cover to the open or closed position to render said auxiliary drive circuit operative, and means movable with said auxiliary drive means to provide a predetermined interval of operation and for actuating said normally-closed switch and said double-pole switch and adapted when the cover is moved to the open position to close said other pole of said double-pole switch to render said drive operating circuit inoperative and for opening said normally closed switch after said predetermined interval to render said auxiliary drive circuit inoperative and when the cover is moved to the closed position to close said normally closed switch and to close said one pole of said double-pole switch after said predetermined interval to render said auxiliary drive circuit inoperative and to render said drive operating circuit operative.

18. In an apparatus for photographically copying documents, the combination with a casing having a cover movable to an open position, a photographing station in said casing for the document, a drive means for moving the document past the photographing station, an exposure station, a camera adapted to support a light-sensitive film in said exposure station, and a second drive means operatively connected to said first-mentioned drive means and for moving said film in synchronism with the document, of a drive operating circuit including a start switch and a motor, a control circuit including a solenoid and a holding switch, said solenoid being energized by the closing of said start switch to close said holding switch to maintain said drive operating circuit closed, an auxiliary drive means operatively connected to said camera and adapted to move said film past said exposure aperture for a predetermined interval, an auxiliary drive circuit including a motor, a normally-closed switch and one pole of a double-pole switch in series-parallel circuit with said motor, a cover switch connected through the other pole of said double-pole switch to said drive operating circuit and said control circuit, connected to said auxiliary drive circuit and adapted upon movement of said cover to the open position to close said auxiliary drive circuit for moving said film for a predetermined interval, and means associated with said auxiliary drive means for closing said other pole of said double-pole switch in said auxiliary drive circuit to render said drive operating circuit and said control circuit inoperative and for opening said normally-closed switch after said predetermined interval to render said auxiliary drive circuit inoperative.

19. In an apparatus for photographically copying documents, the combination with a casing having a cover movable to a closed position, a photographing station in said casing for the document, a drive means for moving the document past the photographing station, an exposure station, a camera adapted to support a light-sensitive film in said exposure station, and a second drive means operatively connected to said first-mentioned drive means and for moving said film in synchronism with the document, of a drive operating circuit including a start switch and a motor, a control circuit including a solenoid and a holding switch, said solenoid being energized by the closing of said start switch to close said holding switch to maintain said drive operating circuit closed, an auxiliary drive means operatively connected to said camera and adapted to move said film past said exposure aperture for a predetermined interval, an auxiliary drive circuit including a motor, a normally-open switch and one pole of a double-pole switch in series-parallel circuit with said motor, a cover switch connected through the other pole of said double-pole switch to said drive operating circuit and said control circuit, connected to said auxiliary drive circuit and adapted upon movement of said cover to the closed position to close said auxiliary drive circuit for moving said film for a predetermined interval, and means associated with said auxiliary drive means for closing said normally-open switch and for closing said one pole of said double-pole switch after said predetermined interval to render said auxiliary drive circuit inoperative and to render said drive operating circuit and said control circuit operative.

20. In an apparatus for photographically copying documents, the combination with a casing having a cover movable to an open or closed position, a photographing station in said casing for the document, a drive means for moving the document past the photographing station, an exposure station, a camera adapted to support a light-sensitive film in said exposure station, and a second drive means operatively connected to said first-mentioned drive means and for moving said film in synchronism with the document, of a drive operating circuit including a start switch and a motor, a control circuit including a solenoid and a holding switch said solenoid being energized by the closing of said start switch to close said holding switch to maintain said drive operating circuit closed, an auxiliary drive means operatively connected to said camera and adapted to move said film past said exposure aperture for a predetermined interval, an auxiliary drive circuit including a motor, a normally-closed switch and one pole of a double-pole switch in series-parallel circuit with said motor, a cover switch connected through the other pole of said double-pole switch to said drive operating circuit and said control circuit, connected to said auxiliary drive circuit and adapted upon movement of said cover to the open or closed position to close said auxiliary drive circuit for moving said film for a predetermined interval, and means associated with said auxiliary drive means and adapted when the cover is moved to the open position to close said other pole of said double-pole switch in said auxiliary drive circuit to render said drive operating circuit and said control circuit inoperative and for opening said normally-closed switch after said predetermined interval to render said auxiliary drive circuit inoperative and when the cover is moved to the closed position to close said normally-closed switch and to close said one pole of said double-pole switch after said predetermined interval to render said auxiliary drive inoperative and to render said drive operating circuit and said control circuit operative.

21. In an apparatus for photographically copying documents, the combination with a casing having a cover movable to an open position, a photographing station in said casing for the document, a drive means for moving the document past the photographing station, an exposure station, a camera adapted to support a light-sensitive film in said exposure station, and a second drive means operatively connected to said first-mentioned drive means and for moving said film in synchronism with the document, of a drive operating circuit including a start switch and a motor, a control circuit including a solenoid and a holding switch, said solenoid being energized by the closing of said start switch to close said holding switch to maintain said drive operating circuit closed, an auxiliary drive means operatively connected to said camera and adapted to move said film past said exposure aperture for a predetermined interval, an auxiliary drive circuit including a motor, a normally-closed switch and one pole of a double-pole switch in series-parallel circuit with said motor, a cover switch connected through the other pole of said double-pole switch to said drive operating circuit and said control circuit, connected to said auxiliary drive circuit and adapted upon movement of said cover to the open position to close said auxiliary drive circuit for moving said film for a predetermined interval, and means including actuating members associated and movable with said auxiliary drive means, one of said actuating members being adapted to release said double-pole switch to close said other pole in said auxiliary drive circuit to render said drive operating circuit and control circuit inoperative and a second actuating member being adapted to engage said normally-closed switch to render said auxiliary drive circuit inoperative.

22. In an apparatus for photographically copying documents, the combination with a casing having a cover movable to a closed position, a photographing station in said casing for the document, a drive means for moving the document past the photographing station, an exposure station, a camera adapted to support a light-sensitive film in said exposure station, and a second drive means operatively connected to said first-mentioned drive means and for moving said film in synchronism with the document, of a drive operating circuit including a start switch and a motor, a control circuit including a solenoid and a holding switch, said solenoid being energized by the closing of said start switch to close said holding switch to maintain said drive operating circuit closed, an auxiliary drive means operatively connected to said camera and adapted to move said film past said exposure aperture for a predetermined interval, an auxiliary drive circuit including a motor, a normally-open switch and one pole of a double-pole switch in series-parallel circuit with said motor, a cover switch connected through the other pole of said double-pole switch to said drive operating circuit and said control circuit, connected to said auxiliary drive circuit and adapted upon movement of said cover to the closed position to close said auxiliary drive circuit for moving said film for a predetermined interval, and means including actuating members associated and movable with said auxiliary drive means, one of said actuating members being adapted to permit closing of said normally-open switch and a second actuating member being adapted to engage said double-pole switch after said predetermined interval to close said one pole to render said auxiliary drive circuit inoperative and to render said drive operating circuit and said control circuit opeative.

23. In an apparatus for photographically copying documents, the combination with a casing having a cover movable to an open or closed position, a photographing station in said casing for the document, a drive means for moving the document past the photographing station, an exposure station, a camera adapted to support a light-sensitive film in said exposure station, and a second drive means operatively connected to said first-mentioned drive means and for moving said film in synchronism with the document, of a drive operating circuit including a start switch and a motor, a control circuit including a solenoid and a holding switch, said solenoid being energized by the closing of said start switch to close said holding switch to maintain said film drive circuit closed, an auxiliary drive means operatively connected to said camera and adapted to move said film past said exposure aperture for a predetermined interval, an auxiliary drive circuit including a motor, a normally-closed switch and one pole of a double-pole switch in series-parallel circuit with said motor, a cover switch connected through the other pole of said double-pole switch to said drive operating circuit and said control circuit, connected to said auxiliary drive circuit and adapted upon movement of said cover to the open or closed position to close said auxiliary drive circuit for moving said film for a predetermined interval, and means including actuating members associated and movable with said auxiliary drive means, one of said actuating members being adapted to release said double-pole switch to close said other pole in said auxiliary drive circuit to render said drive operating circuit and control circuit inoperative upon movement of said cover to the open position and a second actuating member being adapted to engage said normally closed switch to render said auxiliary drive circuit inoperative at the end of said predetermined interval, and said second actuating member being adapted to permit closing of said normally-closed switch upon movement of said cover to a closed position and said first-mentioned actuating member being adapted to engage said double-pole switch at the end of said predetermined interval to close said one pole to render said auxiliary drive circuit inoperative and to render said drive operating circuit and said control circuit operative.

24. In an apparatus for photographically copying documents, the combination with a casing having a cover movable to an open or closed position, a photographing station in said casing for the document, a drive means for moving the document past the photographing station, an exposure station, a camera adapted to support a light-sensitive film in said exposure station, and a second drive means operatively connected to said first-mentioned drive means and for moving said film in synchronism with the document, of a drive operating circuit including a start switch and a motor, a control circuit including a solenoid and a holding switch, said solenoid being energized by the closing of said start switch to close said holding switch to maintain said drive operating circuit closed, an auxiliary drive means operatively connected to said camera and adapted to move said film past said exposure aperture for a predetermined interval, an auxiliary drive circuit including a motor, a normally-closed switch and one pole of a double-pole switch in series-parallel circuit with said motor, a cover switch connected through the other pole of said double-pole switch to said drive operating circuit and said control circuit, connected to said auxiliary drive circuit and adapted upon movement of said cover to the open or closed position to close said auxiliary drive circuit for moving said film for a predetermined interval, and an actuating drive means operatively connected to said auxiliary drive means and including spaced switch-actuating members to provide a predetermined interval of operation, one of said actuating members being adapted to hold said normally-closed switch open when the cover is in the open position and the other actuating member being adapted to hold said one pole of said double-pole switch closed to maintain said drive operating circuit and said control circuit operative when said cover is in the closed position.

25. In an apparatus for photographically copying documents, the combination with a casing having a cover movable to an open or closed position, a photographing station in said casing for the document, a drive means for moving the document past the photographing station, an exposure station, a camera adapted to support a light-sensitive film in said exposure station, and a second drive means operatively connected to said first-mentioned drive means and for moving said film in synchronism with the document, of a drive operating circuit including a start switch and a motor, a control circuit including a solenoid and a holding switch, said solenoid being energized by the closing of said start switch to close said holding switch to maintain said drive operating circuit closed, an auxiliary drive means operatively connected to said camera and adapted to move said film past said exposure aperture for a predetermined interval, an auxiliary drive circuit including a motor, a normally-closed switch and one pole of a double-pole switch in series-parallel circuit with said motor, a cover switch connected through the other pole of said double-pole switch to said drive operating circuit and said control circuit, connected to said auxiliary drive circuit and adapted upon movement of said cover to the open or closed position to close said auxiliary drive circuit for moving said film for a predetermined interval, and an actuating drive means operatively connected to said auxiliary drive means and including a gear having a switch-actuating member on each side thereof and spaced diametrically from each other to provide a predetermined interval of operation, one of said actuating members being adapted to hold said normally-closed switch open when the cover is in the open position and the other actuating member being adapted to hold said one pole of said double-pole switch closed to maintain said drive operating circuit and said control circuit operative when said cover is in the closed position.

26. In an apparatus for photographically copying documents, the combination with a casing having a cover movable to an open or closed position, a photographing station in said casing for the document, a drive means for moving the document past the photographing station, an exposure station, a camera adapted to support a light-sensitive film in said exposure station, and a second drive means operatively connected to said first-mentioned drive means and for moving said film in synchronism with the document, of a drive operating circuit including a start switch and a motor, a control circuit including a solenoid and a holding switch, said solenoid being energized by the closing of said start switch to close said holding switch to maintain said drive operating circuit closed, an auxiliary drive means operatively connected to said camera and adapted to move said film past said exposure aperture for a predetermined interval, an auxiliary drive circuit including a motor, a normally closed switch and one pole of a double-pole switch in series-parallel circuit with said motor, a cover switch connected through the other pole of said double-pole switch to said drive operating circuit and said control circuit, connected to said auxiliary drive circuit and adapted upon movement of said cover to the open or closed position to close said auxiliary drive circuit for moving said film for a predetermined interval, and an actuating drive means operatively connected to said auxiliary drive means and including a gear having a switch-actuating member on each side thereof and spaced diametrically from each other to control the predetermined interval of operation upon movement of said cover to the open or closed position, one of said actuating members being moved to release said double-pole switch to close said other pole in said auxiliary drive circuit to render said drive operating circuit and said control circuit inoperative upon movement of said cover to the open position and said second actuating member being moved to a position for engaging said normally-closed switch to render said auxiliary drive circuit inoperative and said second actuating member being moved to permit closing of said normally closed switch upon movement of said cover to the closed position and said first-mentioned actuating member being moved to a position for engaging said double-pole switch to close said one pole to render said auxiliary drive circuit inoperative and to render said drive operating circuit and said control circuit operative.

27. An apparatus for photographically copying either both or only one side of a document and having a photographing station, an exposure station, a drive means for moving the document through said photographing station, a camera adapted to support a light-sensitive material in said exposure station and for photographing both sides of the document, a second camera adapted to support a light-sensitive material in said exposure station and for photographing only one side of the document, a hanger means for supporting either of said cameras in optical relation to said photographing station, an advancing means operatively connected to said drive means for normally moving said material at a synchronous rate with respect to the movement of the document and selectively at an increased synchronous rate with respect to the document, a control means operatively connected to said advancing means and adapted to be actuated by said second camera when in position on said hanger means for selectively permitting said material to be moved at an increased synchronous rate with respect to the movement of the document, and means for normally indicating the photographing of both sides of the document and adapted by the actuation of said control means by said second camera to indicate the photographing of only one side of the document.

28. An apparatus for photographically copying either both or only one side of a document and having a photographing station, an exposure station, a drive means for moving the document through said photographing station, a camera adapted to support a light-sensitive material in said exposure station and for photographing both sides of the document, a second camera adapted to support a light-sensitive material in said exposure station and for photographing one side of the document, a hanger means for supporting either of said cameras in optical relation to said photographing station, an advancing means operatively connected to said drive means for normally moving said material at a synchronous rate with respect to the movement of the document and selectively at an increased synchronous rate with respect to the document, a control means operatively connected to said advancing means and adapted to be actuated by said second camera when in position on said hanger means for selectively permitting said material to be moved at an increased synchronous rate with respect to the movement of the document, an indicating circuit including a double-pole switch, a lamp for indicating photographing of both sides of the document and a second lamp in parallel with said first lamp for indicating photographing of only one side of the document, one pole of said double-pole switch being in series with said first lamp and normally closed and the other pole of said double-pole switch being in series with said second lamp, and means adapted to engage said double-pole switch and movable with said control means when said second camera is positioned on said hanger means for closing said indicating circuit through said other pole for indicating photographing of only one side of the document.

LINCOLN ROCHESTER TRUST
                     COMPANY,
*Executor of Roy S. Hopkins, Deceased,*
By JOHN W. REMINGTON,
                  *Vice-President.*
ALVIN E. SCHUBERT.
JOHN F. EGAN.

REFERENCES CITED

The following references are of record in the file of this patent:

UNITED STATES PATENTS

| Number | Name | Date |
| --- | --- | --- |
| 1,391,807 | Swalm | Sept. 27, 1921 |
| 1,966,348 | Hughey | July 10, 1934 |
| 1,993,178 | Mitchell | Mar. 5, 1935 |
| 2,161,391 | Schubert | June 6, 1939 |
| 2,391,274 | Schubert | Dec. 18, 1945 |
| 2,403,711 | Egan | July 9, 1946 |
| 2,419,836 | Holbrook | Apr. 29, 1947 |
| 2,452,497 | Shutt | Oct. 26, 1948 |
| 2,472,931 | Yohn | June 14, 1949 |
| 2,492,127 | Hessert | Dec. 20, 1949 |